United States Patent
Petrea et al.

(10) Patent No.: US 6,479,144 B2
(45) Date of Patent: Nov. 12, 2002

(54) ANTI-TACK SPANDEX FIBERS CONTAINING ANTIMICROBIAL AGENTS THEREIN AND FABRICS MADE THEREFROM

(75) Inventors: Randy D. Petrea, Spartanburg; Robert L. Schuette, Boiling Springs; Leland G. Close, Jr., Spartanburg; Shirley Anne Whiteside, Chesnee, all of SC (US)

(73) Assignee: Milliken & Company, Spartanburg, SC (US)

( * ) Notice: Subject to any disclaimer, the term of this patent is extended or adjusted under 35 U.S.C. 154(b) by 36 days.

(21) Appl. No.: 09/729,053

(22) Filed: Dec. 4, 2000

(65) Prior Publication Data

US 2002/0102893 A1 Aug. 1, 2002

(51) Int. Cl.[7] ................................................. B32B 15/00
(52) U.S. Cl. ................. 428/379; 428/293.1; 428/293.4; 428/296.4; 428/364; 428/365; 428/372; 428/375; 428/380; 428/381; 428/384; 428/385; 428/389; 442/123; 442/124; 424/417; 424/421; 424/443; 424/444; 424/445; 424/446; 424/447; 424/608; 424/618
(58) Field of Search ................................ 442/123, 124; 428/293.1, 293.4, 296.4, 364, 365, 372, 379, 380, 381, 384, 385, 389, 907; 424/417, 421, 443, 444, 445, 446, 447, 608, 618

(56) References Cited

U.S. PATENT DOCUMENTS

| 4,296,174 A | | 10/1981 | Hanzel et al. ............... 428/389 |
| 5,503,840 A | * | 4/1996 | Jacobson et al. ............ 424/421 |
| 5,690,922 A | * | 11/1997 | Mouri et al. ................ 424/76.1 |
| 2001/0009831 A1 | * | 7/2001 | Schink et al. ............... 442/123 |
| 2002/0023304 A1 | * | 2/2002 | Chan ......................... 8/115.51 |

FOREIGN PATENT DOCUMENTS

| JP | 6-146112 | | 5/1994 | |
| JP | H-11-124729 | * | 5/1999 | .............. D01F/6/92 |

* cited by examiner

*Primary Examiner*—Terrel Morris
*Assistant Examiner*—Arti R. Singh
(74) *Attorney, Agent, or Firm*—Terry T. Moyer; William S. Parks

(57) ABSTRACT

Polyurethane elastomer yarns (particularly spandex) containing certain silver-based antimicrobial formulations therein are provided. This invention relates to polyurethane elastomer yarns (particularly spandex) containing certain silver-based antimicrobial formulations therein. Such formulations comprise antimicrobial compounds, such as, preferably, triclosan and/or silver-containing ion-exchange resins, such as zirconium phosphate, glass, and/or zeolite compounds. The inventive spandex yarns exhibit excellent antimicrobial qualities as well as surprisingly good anti-tack/frictional characteristics. As a result, antimicrobial spandex yarns are provided which exhibit ease in processing, particularly in further knitting, weaving, etc., to produce fabrics therefrom. Such fabrics are also encompassed within this invention.

10 Claims, 1 Drawing Sheet

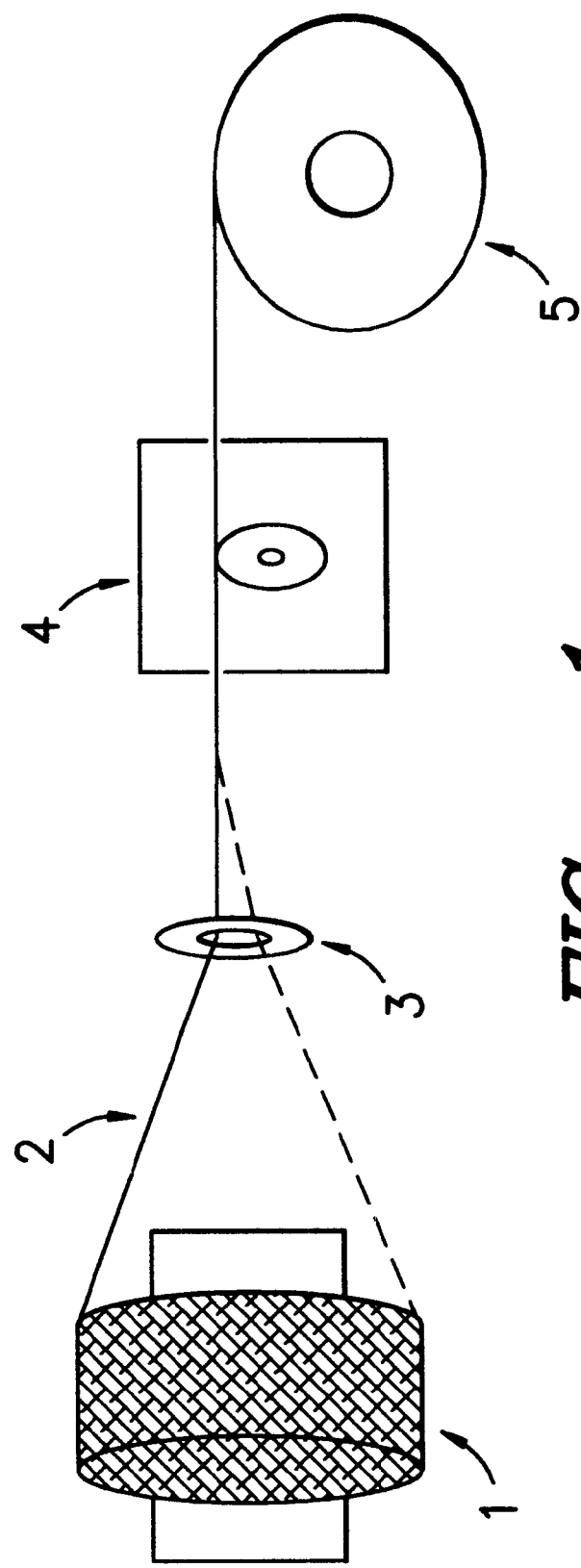
FIG. -1-

ANTI-TACK SPANDEX FIBERS CONTAINING ANTIMICROBIAL AGENTS THEREIN AND FABRICS MADE THEREFROM

FIELD OF THE INVENTION

This invention relates to polyurethane elastomer fibers (particularly spandex) containing certain silver-based antimicrobial formulations therein. Such formulations comprise antimicrobial compounds, such as, preferably, triclosan and/or silver-containing ion-exchange resins, such as zirconium phosphate, glass, or zeolite compounds. The inventive spandex fibers exhibit excellent antimicrobial qualities as well as surprisingly good anti-tack/frictional characteristics. As a result, antimicrobial spandex fibers are provided which exhibit ease in processing, particularly in further knitting, weaving, etc., to produce fabrics therefrom. Such fabrics are also encompassed within this invention.

DISCUSSION OF THE PRIOR ART

All U.S. Patents listed below are herein entirely incorporated by reference.

There has been a great deal of attention in recent years given to the hazards of bacterial contamination from potential everyday exposure. Noteworthy examples of such concerns include the fatal consequences of food poisoning due to certain strains of *Eschericia coli* being found within undercooked beef in fast food restaurants; Salmonella contamination causing sicknesses from undercooked and unwashed poultry food products; and illnesses and skin infections attributed to *Staphylococcus aureus, Klebsiella pneumoniae*, yeast, and other unicellular organisms. With such an increased consumer interest in this area, manufacturers have begun introducing antimicrobial agents within various everyday products and articles. For instance, certain brands of polypropylene cutting boards, liquid soaps, etc., all contain antimicrobial compounds. The most popular antimicrobial for such articles is triclosan. Although the incorporation of such a compound within liquid or certain polymeric media has been relatively simple, other substrates, including the surfaces of textiles and fibers, have proven less accessible. Such compounds are highly desired for fibers and fabrics in order to provide not only antimicrobial benefits, but also mildew and odor control properties.

There thus a long-felt need to provide an effective, durable, reliable antimicrobial spandex fiber which provides such long-term effects. Of additional importance is the need to provide such specific fibers that facilitate, or, at the very least, permit further processing into desired fabrics. Thus, such a desirable fiber must exhibit suitable anti-tack properties thereby permitting continuous utilization without appreciable obstacles to weaving, knitting, and the like, due to cohesion with other spandex fibers or adhesion to process machinery components. In the past, such anti-tack properties have been provided through the incorporation of different compounds, such as metallic soaps (U.S. Pat. No. 4,296,174 to Hanzel et al.), fiber surface finishes, and the like. However, such compounds do not provide antimicrobial characteristics as well.

Other antimicrobial spandex fibers have been produced of the sheath-core type (Japanese Patent Application 6-146112 to Kawanabe) with the antimicrobial agent utilized within the sheath portion. However, such fibers are of the sheath-core variety that relies primarily on the elasticity of the core component for its ultimate function. There have been no teachings of such antimicrobial spandex fibers wherein the antimicrobial component is dispersed substantially throughout the target fiber itself. As such, there are definite differences and improvements upon utilization of complete antimicrobial fibers rather than such sheath-core types. For instance, it is important to realize that spandex fibers are not always utilized as in complete form from initial production. The fibers themselves are generally either cut for insertion within discrete areas of target fabrics or, upon incorporation within fabrics (e.g., knit, woven, non-woven, and the like), are cut for further insertion as fabric components within other fabrics. In such an instance, sheath-core yarns do not provide any appreciable increase in antimicrobial activity from standard initial production to "cut" configuration. By contrast, single-component yarns exhibiting antimicrobial compounds dispersed throughout provide desirable improvements in antimicrobial characteristics upon being cut since more antimicrobial is exposed.

Another important distinction lies in the potential for moisture to mobilize the antimicrobial compounds within the target fibers. Spandex, being a polyurethane, is somewhat hydrophilic and draws moisture readily from the surrounding atmosphere. Upon such moisture regain by the target fibers, a silver-based antimicrobial (as one example) can exhibit migration of silver particles within and possibly to the surface of the target fiber. With a sheath-core configuration, the potential for relatively quick loss of such particles by moving to the surface (and subsequently removed by friction, etc.) is quite high, considering the short distance required to reach such a destination. However, a single component spandex fiber will not exhibit such high probabilities of rapid antimicrobial loss because of the greater amount of antimicrobial therein and thus the greater distance required for movement to the surface.

Furthermore, with regard to silver-based inorganic antimicrobial materials, sheath-core fiber configurations are not particularly suitable for full efficacy thereof. For example, it has been found that certain silver-based ion-exchange compounds (such as ALPHASAN® brand antimicrobials available from Milliken & Company) exhibit regenerable characteristics for antimicrobial properties. After a period of time, the silver solids become depleted through bactericidal activity; however, upon frictional contact with the substrate surface, new, unused silver components are brought to the surface, thus providing a regenerable antimicrobial source. With a sheath-core configuration, the sheath itself is so thin that the amount of silver particles present therein is very limited. Thus, the antimicrobial lifetime of such a fiber is itself rather limited since very little extra silver particle source is available in such an instance. To the contrary, an entire fiber comprised of such silver particles will theoretically provide long-lasting, renewable antimicrobial properties.

Additionally, sheath-core configured fibers have proven to be impractical from an industrial production standpoint as well. Sheath-core fiber configurations are limited to production by melt-spun processes. Most spandex fibers, however, are produced via solution-spun processes. Hence, sheath-core types are not widely available. Also, it is very difficult and expensive to uniformly produce sheath-core yarns due to the equipment required and/or available. The trouble inherent with controlling the sheath placement around the core is extremely difficult to handle on a large-scale level and thus limits production speeds.

Thus, there is a need to provide long-lasting antimicrobial spandex fibers for incorporation within apparel and other fabrics that exhibit proper antimicrobial characteristics and is likewise processable into such fabrics, and the like. Unfortunately, to date, no such particular spandex fibers, or antimicrobial fabrics encompassing such fibers, has been accorded the apparel and fabric industries by the pertinent prior art.

DESCRIPTION OF THE INVENTION

It is thus an object of the invention to provide a spandex fiber comprising silver-based inorganic antimicrobial throughout said fiber. It is further object of the invention to provide a fabric article comprising such spandex fibers, and more particularly an apparel article comprising same. Yet another object of the invention is to provide a spandex fiber (such as above) that exhibits excellent processability within fabric producing machines (e.g., weaving looms, knitting machines, and the like), such that said spandex fibers exhibit extremely low, if not nonexistent, levels a cohesion between different portions of individual spandex fibers or between portions of different spandex fibers. A further object is to provide such excellent processability without the need for high levels of finishing agents contacted with the target fiber substrate, thereby resulting in significant reductions of finishing chemicals used and process steps performed.

Accordingly, this invention encompasses a spandex fiber comprising an antimicrobial compound in discrete areas of said fiber wherein at least some of said antimicrobial compound is present at the surface of said fiber and at least some of said antimicrobial is present within said fiber at a distance of from the center of such fiber to about least one-half the radius of said fiber from said yarn center. Furthermore, this invention also encompasses a fabric article comprising at least one spandex fiber as described above. Additionally, the invention encompasses a spandex fiber comprising at least one silver-based inorganic antimicrobial compound wherein said spandex fiber exhibits a cohesive property with either itself or a different spandex fiber of the same type of below about 0.8 grams as measured by an over-end takeoff tension procedure (thereby exhibiting very low anti-tack properties). Also, this invention encompasses a spandex fiber as defined above, and exhibiting the aforementioned anti-tack characteristics without the presence of an appreciable amount of anti-tack finishing agents thereon.

The antimicrobial compound of this invention may be any type which imparts the desired log kill rates discussed below to *Staphylococcus aureus* and *Klebsiella pneumoniae*. Furthermore, such compounds must be able to be incorporated within the target spandex fibers. Thus, silver-based antimicrobials, triclosan, and the like, are non-limiting potential compounds for this purpose. The preferred compounds are silver-based inorganic antimicrobials which include silver particles or silver ions that exhibit such antimicrobial effects. More preferred compounds are those selected from the group consisting of silver-based ion-exchange resins, such as silver-based zirconium phosphates, silver-based zeolites, silver-based glasses, and any mixtures thereof Most preferably, such a compound is a silver-based ion-exchange compound and particularly does not include any added organic bactericide compounds (thereby not permitting a release of volatile organic compounds into the atmosphere during processing at high temperatures, etc.). The preferred silver-based ion exchange material is an antimicrobial silver zirconium phosphate available from Milliken & Company, under the tradename ALPHASAN®. Other potentially preferred silver-containing solid inorganic antimicrobials in this invention are silver-substituted zeolites available from Sinanen under the tradename ZEOMIC®, or a silver-substituted glasses available from Ishizuka Glass under the tradename IONPURE®, may be utilized either in addition to or as a substitute for the preferred species. Other possible compounds, again without limitation, are silver-based materials such as MICROFREE®, available from DuPont, as well as JMAC®, available from Johnson Mathey. Generally, such a metal compound is added in an amount of from about 0.01 to 10% by total weight of the particular spandex fibers; preferably from about 0.01 to about 5%; more preferably from about 0.1 to about 2%; and most preferably from about 0.2 to about 2.0%.

The term spandex, as noted above, is intended to cover any standard polyurethane-type fibers which exhibit excellent elongation and recovery characteristics. Spandex has been utilized within fabrics for many years and are generally produced from fiber-forming, long-chain, synthetic polymers comprised of at least 85% of a segmented polyurethane, such as those based on polyethers or polyesters. Manufacture of such fibers is well known and taught within U.S. Pat. Nos. 4,296,174, 3,555,115, 3,553,290, 3,428,711, 3,097,192, and 2,929,804, all herein entirely incorporated by reference.

Such fibers should be well appreciated by the ordinarily skilled artisan as possessing a single-layer configuration (not a sheath-core configuration which exhibits undesirable aid limited properties, as discussed above). As such, as alluded to above, the target fibers will contain antimicrobial compounds throughout their structures, In such an instance, at least a portion of the surface of any inventive fiber will exhibit some antimicrobial compounds as well as the interior of such a fiber. Thus, at least some antimicrobial compound must be present within the target inventive yarn as well, particularly in the area from the center of the fiber to a distance measured to be at least one-half of the radius (and thus such a distance from the center). In such a manner, it is clear that the prior art sheath-core type fiber are not encompassed within such a definition since the entire antimicrobial compound taught in that instance resides either at the fiber surface or as relatively close to the surface. It is to be understood that such a definition does not require every center portion of the target inventive fiber to exhibit such antimicrobial activity, only that such antimicrobial compounds are not limited in location to the surface or an area strictly adjacent thereto (i.e., in a sheath portion). Preferably, the distance from the center at which such antimicrobials will reside will be at least one-third of the radius; more preferably about one-fourth of the radius; and most preferably about one-fifth of the radius from the center.

Furthermore, such inventive spandex fibers may exhibit deniers from anywhere between 0.01 to 1,000,000, Such fibers may also be monofilament or multifilament in structure. Preferably, the inventive fibers are monofilament and possess deniers from 1 to 100,000; more preferably from 10 to 10,000;and most preferably from about 50 to about 1,000.

The particular antimicrobial compound (or compounds as more than one type may be present) should exhibit an acceptable log kill rate after 24 hours in accordance with the AATCC Test Method 100-1983. Such an acceptable level log kill rate is tested for *Staphylococcus aureus* or *Klebsiella pneumoniae* of at least 0.1 increase over baseline, Alternatively, an acceptable level will exist if the log kill rate is greater than the log kill rate for non-treated (i.e., no solid inorganic antimicrobial added) fibers (such as about 0.5 log kill rate increase over control, antimicrobial-free yarns). Preferably these log kill rate baseline increases are at least 0.3 and 0.3, respectively for *S. aureus* and *K pneumoniae*; more preferably these log kill rates are 0.5 and 0.5, respectively; and most preferably these are 1.0 and 1.0, respectively. Of course, the high end of such log kill rates are much higher than the baseline, on the magnitude of 5.0 (99.999% kill rate). Any rate in between is thus, of course, acceptable as well. However, log kill rates which are negative in number are also acceptable for this invention as long as such measurements are better than that recorded for correlated non-treated spandex fibers. In such an instance, the antimicrobial material present within the latex at least exhibits a hindrance to microbe growth.

As defined herein, the term "take-off tension" is the tension required for the delivery of 50 meters per minute of spandex fiber over the end of the fiber package. This tension is measured in accordance with the following procedure and by means of the apparatus depicted in FIG. 1, described more fully below. Such a procedure thus measures the average tension required to remove the fiber from a fiber package at a set rate of removal, Any spikes in the recorded tension graph above 0.8 grams is highly undesirable (and represents an area on the yarn which exhibits an excessive level of tack). Such spikes are known as tension transients; the inventive fibers will not exhibit more than 20 of such tension transients in any measurement of 250 consecutive meters of fiber; preferably the number of tension transients is below about 15; more preferably less than 10; and most preferably as low as zero.

Without intending to be limited to any specific scientific theory, it is believed that such anti-tack benefits are the result of antimicrobial particles present on the surface of the target spandex yarns. Such particles appear to extend outward from the fiber surface a distance sufficient to prevent repeated and continuous contact between polyurethane components of two separate fibers (or different portions of the same yam). Such a benefit is best noted through the ability to drastically reduce, if not essentially eliminate, the need for the utilization of finish additives from the spandex fiber production method. As noted above, and more succinctly in U.S. Pat. No. 4,296,174, discussed and incorporated herein above, spandex exhibits high tack levels inherently on its surface. Finish additives (such as fiber lubricants), incorporating such active ingredients as metal salts (magnesium stearate, for example) and metallic soaps, as well as other formulations, have been utilized traditionally to prevent such tack problems (for example Kelmar® 660, from Kelmar, Inc., a silicone lubricant comprising magnesium stearate). Surprisingly, it has been found that the utilization of certain antimicrobial particles (compounds) within spandex yarns provides not only desirable antimicrobial characteristics, but also excellent anti-tack properties. Thus, the utilization of such antimicrobial as taught within this invention permits a drastic reduction in the amount of finish additives required to provide such anti-tack properties. Furthermore, since the finish additives are generally removed after further processing (e.g., knitting, weaving, and the like) of the spandex fibers, the utilization of such antimicrobial spandex fibers as now taught permits a reduction in the number of process steps required as well as potential effluent discharge after removal of such finish formulations. The level of finish additives needed for anti-tack improvements can thus be lowered to at most 2.5% owf, preferably as low as 2.0% owf, more preferably at most 1.5% owf, and, most preferably at most 1.0% owf.

The preferred embodiments of these alternative yam treatments are discussed in greater detail below. Fabrics comprising such inventive fibers may be of knit, woven, in-laid, scrim, non-woven, and the like construction and may include the inventive spandex fibers woven, knitted, etc., with any other fiber types to produce a fabric blend. Furthermore, the individual fibers may also be covered with different types of fibers including, without limitation, such natural fibers as cotton, wool, ramie, hemp, abaca, and the like, or such synthetic fibers as nylon, polyester, acrylic, and the like. Again, as noted above, such covered fibers permit stretch characteristics with excellent hand and feel for the wearer (if apparel is produced from such fibers).

BRIEF DESCRIPTION OF THE DRAWING

FIG. 1 depicts the process of measuring take-off tension as discussed above.

DETAILED DESCRIPTION OF THE DRAWING

As presented in FIG. 1, a spandex fiber 2 is strung-up in succession over the end of a fiber package 1, through a ceramic eyelet 3, across a tension head 4, and taken-up on a drive wheel 5. The tension head 4 is connected via electrical lines (not illustrated) to a computer (not illustrated) where five measurements per second are made throughout the run time. Take-up drive wheel 5 is driven to remove fiber 2 from the package 1 at 50 meters per minute. The test is run for 5 minutes, so that for each measurement 250 meters of fiber are examined and 1500 readings are performed.

DESCRIPTION OF THE PREFERRED EMBODIMENTS

Examples of particularly preferred compounds and fibers within the scope of the present invention are set forth below.
Spandex Fiber Production Thermoplastic polyurethane (TPU) pellets (Pellethane2103-70A) were obtained from Dow Plastics and mixed with 0.5%, 1.0%, and 2.0% of each antimicrobial additive. The coated pellets were then dried in a vacuum oven at 105° F. for 24 hours to remove any residual moisture. The pellets were then melt extruded into 70 denier monofilament fibers, coated with a standard spandex fiber lubricant (Kelmar® 660, available from Kelmar, Inc.) to a finish level of 2.5% owf, and wound on a package at Alex James and Associates, Inc. in Greenville, S.C.

The test procedure of FIG. 1 was used to measure the reduction in take-off tension for inventive and comparison spandex fibers containing commercially available antimicrobial additives.

EXAMPLE 1

Pellethane 2130-70A pellets were were placed in a KitchenAid Proline Model KSM5 mixer and 0.5% AlphanSan® RC5000 was added. The mixer was run for 30 minutes to ensure uniform coating of the pellets and then dried in a vacuum oven at 105° F. for 24 hours to remove any residual moisture, The coated pellets were then melt extruded, coated with spin finish (Kelmar® 660) to a finish on fiber (owf) level of 2.5% and the fiber was wound on a package. The average take-off tension and tension transients were then measured according to the above-mentioned test method. After fiber production, it was noted that the antimicrobial was dispersed throughout the fiber structure.

EXAMPLE 2

Pellethane 2130-70A pellets were were placed in a KitchenAid Praline Model KSM5 mixer and 0.5% IonPure® Type H was added. The mixer was run for 30 minutes to ensure uniform coating of the pellets and then dried in a vacuum oven at 105° F. for 24 hours to remove any residual moisture. The coated pellets were then melt extruded, coated with spin finish (Kelmar® 660) to a finish on fiber (owf) level of 2.5% and the fiber was wound on a package. The average take-off tension and tension transients were then measured according to the above-mentioned test method. After fiber production, it was noted that the antimicrobial was dispersed throughout the fiber structure.

EXAMPLE 3

Pellethane 2130-70A pellets were were placed in a KitchenAid Proline Model KSM5 mixer and 0.5% Zeomic® AJ80H was added. The mixer was run for 30 minutes to ensure uniform coating of the pellets and then dried in a vacuum oven at 105° F. for 24 hours to remove any residual moisture. The coated pellets were then melt extruded, coated with spin finish (Kelmar® 660) to a finish on fiber (owf) level of 2.5% and the yarn was wound on a package. The average take-off tension and tension transients were then measured according to the above-mentioned test method. After fiber production, it was noted that the antimicrobial was dispersed throughout the fiber structure.

EXAMPLE 4

Pellethane 2130-70A pellets were were placed in a KitchenAid Proline Model KSM5 mixer and 0.5% Triclosan was added. The mixer was run for 30 minutes to ensure uniform coating of the pellets and then dried in a vacuum oven at 105° F. for 24 hours to remove any residual moisture. The coated pellets were then melt extruded, coated with spin finish (Kelmar® 660) to a finish on fiber (owf) level of 2.5% and the fiber was wound on a package. The average take-off tension and tension transients were then measured according to the above-mentioned test method. After yarn production, it was noted that the antimicrobial was dispersed throughout the fiber structure.

The results of the take-off tension tests are as follows with a control comparison comprising no antimicrobial:

| Take-Off Tension Measurements | | |
| --- | --- | --- |
| | Tension (in grams) | Number of Tension Transients |
| Example | by average | >0.8 g | >1.2 g |
| Control | 1.113 g | 1,440 | 44 |
| 1 | 0.459 g | 14 | 0 |
| 2 | 0.453 g | 1 | 0 |
| 3 | 0.604 g | 148 | 0 |
| 4 | 0.587 g | 81 | 0 |

The Example spandex fibers were also tested for discoloration (photoreduction) after exposure to typical indoor (fluorescent) light after 1 month of such storage. Of the silver-based antimicrobials, AlphaSan® clearly exhibited the best performance in this instance. Thus, for this purpose AlphaSan®-type antimicrobials are most preferred. The triclosan exhibited excellent colorations as well; however, such an antimicrobial is highly water soluble and thus washes easily from the surface of the target spandex fiber. Thus, for anti-tack, discoloration, and resiliency within and on the target spandex fibers, the AlphaSan® antimicrobials are, again, most preferred The discoloration results are as follows, again with a non-antimicrobial control for comparison:

| Discoloration Determinations | |
| --- | --- |
| Example | Resultant Color |
| Control | Off-White |
| 1 | Off-White |
| 2 | Brown |
| 3 | Bronze |
| 4 | Off-White |

These Examples were also tested for antimicrobial activity in accordance with proposed ASTM Draft Test Method for Determining the Antimicrobial Activity of Immobilized Antimicrobial Agents Under Dynamic Contact Conditions, No. Z8459Z, herein entirely incorporated by reference, for measuring log kill rates for *Staphylococcus aureus* after 22 hours exposure at room temperature. The results are as follows, again with a non-antimicrobial control fiber:

| Antimicrobial Results | |
| --- | --- |
| Example | Log Kill Rate |
| Control | 0.015 |
| 1 | 1.70 |
| 2 | 1.45 |
| 3 | 0.55 |
| 4 | 1.65 |

Thus, the Control exhibited very little antimicrobial activity without any of such additives present. Also, the inventive spandex fibers exhibit excellent anti-tack characteristics as well as acceptable antimicrobial properties. Furthermore, the preferred ion-exchange antimicrobial compound exhibited excellent colorations (and thus low degrees of discoloration) within the target fibers as well.

A fabric sheet was then woven from such Example 1 fibers which exhibited excellent stretch characteristics as well as the other properties measured above.

There are, of course, many alternative embodiments and modifications of the present invention which are intended to be included within the spirit and scope of the following claims.

What we claim is:

1. A spandex fiber comprising an antimicrobial compound in discrete areas of said fiber wherein at least some of said antimicrobial compound is present at the surface of said fiber and at least some of said antimicrobial is present within the area of said fiber from the center to a distance of one-half the radius of said fiber, wherein said antimicrobial compound is selected from the group consisting of triclosan, a silver-based zeolite, a silver-based glass, and any mixtures thereof.

2. A fabric article comprising at least one spandex fiber as defined in claim 1.

3. A spandex fiber comprising a particulate antimicrobial compound in discrete areas of said fiber wherein at least some of said particulate antimicrobial compound is present at the surface of said fiber and at least some of said antimicrobial is present within the area of said fiber from the center to a distance of one-half the radius of said fiber, wherein said antimicrobial compound is a silver-based ion-exchange agent, and wherein said fiber exhibits a cohesive property with itself or another like elastomeric spandex fiber lower than that for the same type of elastomeric spandex fiber but free from any added particulate antimicrobial present at the surface thereof.

4. The spandex fiber of claim 3 wherein said spandex fiber exhibits a cohesive property with either itself or a different spandex fiber of the same type of below about 0.8 grams as measured by an over-end take-off tension procedure.

5. The spandex fiber of claim 4 wherein said spandex fiber exhibits such take-off tension measurements with a level of anti-tack finish additive in an amount of at most 2.5% owf.

6. A fabric article comprising at least one spandex yarn as defined in claim 5.

7. A fabric article comprising at least one spandex fiber as defined in claim 4.

8. The spandex fiber of claim 3 wherein said fiber does not include any added organic bactericide compound.

9. A fabric article comprising at least one spandex fiber as defined in claim 8.

10. A fabric article comprising at least one spandex fiber as defined in claim 3.

* * * * *